June 2, 1964  J. T. McNANEY  3,135,866
PHOTOELECTRIC STORAGE DEVICES USING JACKETED LIGHT FIBERS
Filed Aug. 29, 1961
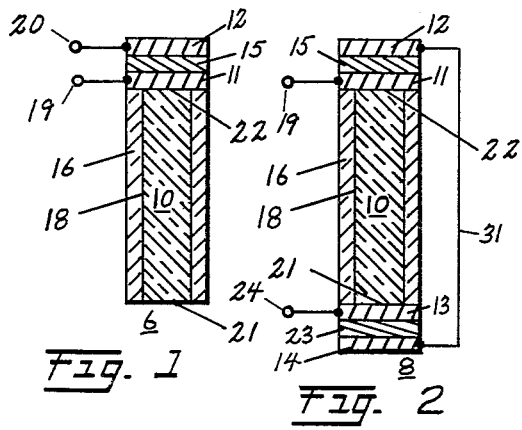
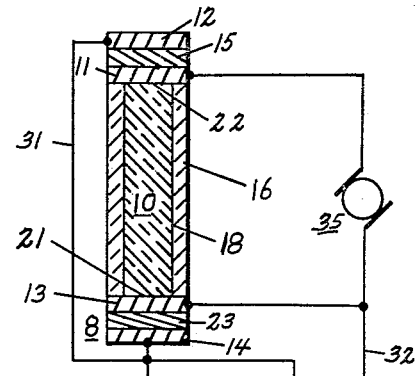
INVENTOR.
Joseph T. McNaney

United States Patent Office 3,135,866
Patented June 2, 1964

3,135,866
PHOTOELECTRIC STORAGE DEVICES USING
JACKETED LIGHT FIBERS
Joseph T. McNaney, 8548 Boulder Drive, La Mesa, Calif.
Filed Aug. 29, 1961, Ser. No. 135,109
8 Claims. (Cl. 250—213)

This invention relates to photoelectric circuit elements and more particularly to improvements in photoelectric elements utilizing light conducting fibers to provide more efficient and selective illumination of photoconductors associated therewith. Furthermore, this invention relates to improvements in photoelectric light regenerative memory devices in combination with small diameter, highly efficient, light conducing fibers for use in Write, Read and Erase data handling circuitry.

Memory devices to which those of my invention are closely related are most commonly used in conjunction with electronic computing apparatus embodying random-access Memory, or storage, functions. These functions normally include the storage of data, the transfer of data, and the removal of data from data storage means. The storage means may include an array of data Memory devices, and the random-access Memory functions may be referred to as Write, Read and Erase.

The light conducting fibers which I utilize in the present invention, sometimes referred to as light pipes, operate as light conductors by reflecting light waves from one side to the other along their longitudinal dimension, provided, the angle at which light strikes the side of the fiber is greater than the critical angle. The critical angle may be as small as 50 degrees, depending of course upon the fiber material. Light conducting materials from which fibers have been made include quartz, glass, Lucite, nylon and like materials. Light conducting fibers have been drawn to diameters of less than 0.001", and fibers of this dimension have been capable of conducting light waves with a high degree of efficiency through fiber lengths exceeding 25 feet. The outer surface of these fibers normally contain a fire polished surface and, when such surfaces are intimately joined with an environment having a relatively high index of refraction, compared to the index of the fiber, light waves will be conducted away from the fiber. It is of the utmost importance, therefore, to jacket the fiber with a material having a relatively low index of refraction, or, support such fibers in an environment having a relatively low index of refraction. In order that I may obtain the highest degree of light conduction efficiency from such fibers in combination with the photoelectric devices concept of this invention, I prefer to jacket the fibers in a material having a relatively low index of refraction, utilizing a jacket thickness in excess of several microns.

In the present improvements in photoelectric devices and circuit elements I utilize light conducting fibers having a relatively high index of refraction, a longitudinal dimension exceeding its cross sectional dimension, an outer surface generally along its longitudinal dimension being fire polished to a smooth surface, and a jacket of material having a relatively low index of refraction intimately joined with the outer surface of the fiber to form an interface at and along the juncture. Since a wave train of light being conducted through a given fiber by internal reflections will actually penetrate the jacket beyond the interface of the jacket and the fiber a little more than a wavelength, before the electromagnetic field carried by the wave dies away to a negligible amount and before turning back into the fiber, the jacket thickness will be equal to at least several microns. The fibers are provided with first and second transverse ends. The first transverse end will be adapted to receive light waves from a remote source of light, or from an electroluminescent phosphor supported adjacently thereto. The function of the second transverse end of the fibers will be to emit light waves, having been conducted through the fiber by internal reflections, to an adjacent layer of photoconductive material.

The photoconductor layer is sandwiched between a first electrode and a plurality of individual second electrodes. The first electrode is intimately joined with the second end of the fibers and the plurality of individual second electrodes are supported by, and connected operatively with, the photoconductor layer adjacent predetermined second transverse ends of the fibers. The plurality of second electrodes, therefore, are electrically insulated from one another to provide the necessary means of circuit independency.

Improvements in light regenerative Memory devices include, in combination with the photoelectric circuit elements described thus far, an electroluminescent layer sandwiched between a third electrode and a plurality of individual fourth electrodes, the third electrode being intimately joined with the first transverse ends of the fibers and the plurality of individual fourth electrodes being intimately joined with the electroluminescent layer adjacent predetermined first transverse ends of the fibers. The fourth electrodes are electrically insulated from one another to provide, additionally, circuit independency. Circuit independency of the second and fourth electrodes is important to the operation of the invention when the light regenerative Memory devices are combined in large numbers with an array of light conducting fibers.

It is therefore an object of this invention to provide photoelectric circuit elements, either in the form of single elements or in the form of large arrays, which are inherently simple in their construction, extremely efficient in their operation and relatively inexpensive to fabricate.

Another object of this invention is to provide an improvement in photoelectric devices which lend themselves extremely well to compacting large assemblies of such devices.

A further object of this invention is to provide improvements in light regenerative Memory devices capable of being circuitously interconnected to perform such data handling functions as Write, Read and Erase.

Other objects and advantages of the invention will become apparent from the following description when read in conjunction with the accompanying drawing in which:

FIGURE 1 is a view in cross section of an improvement in photoelectric devices;

FIGURE 2 is a view in cross section of an improvement in light regenerative Memory devices;

FIGURE 3 is a view in cross section of the improvements in photoelectric devices circuitously interconnected to perform such functions as Write, Read and Erase, in response to light radiation input commands;

FIGURE 4 is a view in cross section of the improvements in photoelectric devices circuitously interconnected to perform such functions as Write, Read and Erase, in response to electronic circuit switching means;

FIGURE 5 is a view in cross section of the improvements in photoelectric devices shown in an array having the capability of being circuitously interconnected to perform such functions as Write, Read and Erase.

Referring now to FIGURE 1, a unitary circuit control element 6, or photoelectric device, is shown comprising in combination a light conducting fiber 10, a first electrode 11, a second electrode 12, a photoconductor layer 15 intermediate the first electrode 11 and the second electrode 12, and a jacket 16 of light conducting material. The fiber 10 has a relatively high index of refraction, a longitudinal dimension exceeding its cross sectional dimension, an outer surface 18 generally along its longitudinal dimension and which surface is, for example, fire polished to a smooth surface, and first and second transverse ends 21 and 22. The cross sectional shape of the fiber 10 may be round, rectangular, hexagonal, or of any other cross sectional shape. The jacket 16 has a relatively low index of refraction, intimately joined with and surrounding the outer surface 18, forming an interface at and along the juncture 18. The thickness dimension of the jacket 16 is in excess of two microns. The low index of the jacket 16 and its thickness dimension being in excess of two microns, permit the jacket 16 to conduct light waves from the first transverse end 21 to the second transverse end 22 with a high degree of efficiency.

The first electrode 11 is preferably of light transparent material. An example of a well known light transparent material that may be used for this purpose is a conductive material produced by Pittsburgh Plate Glass Company, under the name "NESA" transparent conductive material. The first electrode 11 is intimately joined with the second transverse end 22. The photoconductor layer 15 is disposed upon the first electrode 11 and connected operatively therewith, whereby, the photoconductor layer 15 will be illuminated by light waves from the second transverse end 22, which light waves were conducted through the fiber 10 upon entering the first transverse end 21.

The photoconductor layer 15 may be of such material as selenium, cadmium sulphide, silver selenide, germanium, or of like materials. The second electrode 12, which may be light transparent such as "NESA" material, is connected operatively with the photoconductor layer 15, whereby, the second electrode 12 will be electrically connected with the first electrode 11 through the thickness of the photoconductor layer 15 upon the illumination of the latter by light waves from the second transverse end 22. Under these circumstances the photoconductor layer 15 may be changed from a dark resistance state to a low resistance state, thereby, lowering the resistance between the first electrode 11 and the second electrode 12 upon the admittance of light waves to the first transverse end 21. The first and second electrodes 11 and 12 are connected, respectively, to terminals 19 and 20.

In FIGURE 2, a further embodiment of the photoelectric circuit element of FIGURE 1 is shown to include additionally a third light transparent electrode 13, a fourth electrode 14, and an electroluminescent layer 23 intermediate the third and fourth electrodes 13 and 14. The third electrode 13 is intimately joined with the first transverse end 21 of the fiber 10; the electroluminescent layer 23, containing electroluminescent phosphor particles in a dielectric media, is disposed upon and intimately joined with the third electrode 13, whereby light waves eminating from the electroluminescent layer 23 will be permitted to enter the first transverse end 21 of the fiber 10; and the fourth electrode 14 is disposed upon and intimately joined with the electroluminescent layer 23, whereby an electrical potential will be impressed across the electroluminescent layer 23 when an electrical potential is connected between the third and fourth electrodes 13 and 14. The photoelectric device 8 may, therefore, be utilized in circuitry to perform such functions as Write, Read or Erase, by reason of the fact that the first, second, third and fourth electrodes 11, 12, 13 and 14 are available for circuit connections. The first and third electrodes 11 and 13 are shown connected, respectively, to terminals 19 and 24. The second and fourth electrodes 12 and 14 are shown connected by a common circuit 31. The circuit element 8, or photoelectric device 8, when connected in this manner, and having a potential between terminals 19 and 24, will function as a light regenerative Memory element, which function will be described in conjunction with further embodiments of the invention.

Referring now to FIGURE 3, the circuit element 6 of FIGURE 1, and the circuit element 8 of FIGURE 2, are combined in a circuit to perform Write, Read and Erase functions in response to light radiation input command signals. The circuit element 8 will respond to Write signals; the circuit element 6a will respond to Read signals; and the circuit element 6b will respond to Erase signals.

The first circuit element 8 of FIGURE 3 is shown where the second and fourth electrodes 12 and 14 are connected by means of a first common circuit 31, which, in this instance will function as a data Memory element. The second electrode 12 of a third circuit element 6b is also connected to the first common circuit 31. The third electrode 13 of the first circuit element 8, the first electrode 11 of the second circuit element 6a, and the first electrode 11 of the third circuit element 6b, are connected to a second common circuit 32. A source of potential 35 is connected between the first electrode of the first circuit element 8 and the second common circuit 32. An output circuit means 36, exemplified as being a transformer 36 having a primary winding 37 and a secondary winding 38, is shown as having the primary 37 connected between the first common circuit 31 and the second electrode 12 of the second circuit element 6a.

When in operation, light radiation from an external source will be used to illuminate the photoconductor 15 of the first circuit element 8, thereby lowering the photoconductor 15 resistance between the potential source 35 and the fourth electrode 14 of the first circuit element 8, establishing an electrical field between the third electrode 13 and the fourth electrode 14 and across the electroluminescent layer 23 of the circuit element 8. The potential influence will cause an emanation of light from the electroluminescent layer 23. Light waves will enter the first transverse end 21 and will be conducted to the second transverse end 22 to thereby illuminate the photoconductor layer 15 of the element 8, whereupon the light regenerative action of element 8 will have resulted in the completion of a Write function. The presence of a potential on the fourth electrode 14 of the element 8 will also represent a storage of data in the circuit element 8, or, in the Memory element 8.

Data stored in the Memory element 8 will be Read out by admitting light radiation from an external source to the first transverse end 21 of the circuit element 6a. Light waves will be conducted to, and thereby illuminate, the photoconductor layer 15, connecting the second electrode 12 to the first electrode 11 through the low resistance of the photoconductor layer 15 of the element 6a. The primary winding 37 will be connected to the source of potential 35 through the low resistance of the photoconductor layers 15, respectively, of circuit elements 8 and 6a, resulting in a Read current in the secondary winding 38 of the transformer 36. The data may be Read from the Memory element 8 by the light controlled circuit element 6a as many times as is necessary without destroying the data.

Data will be Erased from the Memory element 8 by admitting light radiation from an external source to the first transverse end 21 of the third circuit element 6b. Light waves will be conducted to, and thereby illuminate, the photoconductor layer 15, connecting the second electrode 12 to the first electrode 11 through the low resistance of the photoconductor layer 15 of the third circuit element 6b. Since the second electrode 12 of the third element 6b is connected to the fourth electrode of the Memory element 8, the low resistance circuit will have been established across the electroluminescent layer 23, lowering the potential across the latter sufficiently to bring to an end the light regenerative action of the Memory element 8. This action will also have resulted in an Erasure of the data in the Memory element 8.

In FIGURE 4, three of the photoelectric circuit elements 8, described generally thus far in FIGURES 2 and 3, are included in data Write, Read and Erase circuitry wherein such functions are performed in response to light input signals under the control of circuit switching means. A first circuit element 8 will respond to Write switch means; a second circuit element 8a will respond to Read switch means; and a third circuit element 8b will respond to Erase switch means. The second and fourth electrode 12 and 14 of the first element 8, and the second electrode 12 of the third element 8b, are connected to a first common circuit 31. The third electrode 13 of the first element 8, the first electrode 11 of the second element 8a, and the first electrode 11 of the third element 8b, are connected by means of a second common circuit 32. The first electrode 11 of the first element 8, the third electrode 13 of the second element 8a, and the third electrode 13 of the third element 8b, are connected to a third common circuit 33. A source of potential 35 is connected between the second and third common circuits 32 and 33. An output circuit means 36, exemplified as being a transformer 36 having a primary winding 37 and a secondary winding 38, is shown as having its primary winding 37 connected between the first common circuit 31 and the second electrode 12 of the second element 8a. A Write switch means 41 is connected between the second electrode 12 of the first element 8 and the third common circuit 33. A Read switch means 42 is connected between the fourth electrode 14 of the second element 8a and the third common circuit 33. An Erase switch means 43 is connected between the fourth electrode 14 of the third element 8b and the third common circuit 33.

A Write function will include a momentary closing of the switch means 41, which presents a potential influence across the electroluminescent layer 23 of the element 8, from the potential source 35. Light waves from the layer 23 will lower the resistance of the photoconductor layer 15, establishing a light regenerative condition in the Memory element 8. The presence of a potential on the fourth electrode 14 of the Memory element 8 represents the storage of data therein.

Data stored in the Memory element 8 will be Read out by a momentary closing of the switch means 42, which presents a potential influence from the source 35 across the electroluminescent layer 23 of the Read element 8a. Light waves from the layer 23, which serve as a light link between the switch 42 and the transformer 36, will lower the resistance of the photoconductor layer 15 of the Read element 8a, thereby connecting the primary winding 37 of the output means 36 across the potential source 35, through the low resistance of the photoconductor layers 15, respectively, of the Memory element 8 and the Read element 8a. A Read current will flow in the secondary winding 38 of the output means 36.

Data will be erased from the Memory element 8 upon a closing of the switch means 43, which will present a potential from the source 35 across the electroluminescent layer 23 of the Erase element 8b. Light waves from the layer 23, which serve as a light link between the switch 43 and the element 8, will lower the resistance of the photoconductor layer 15 of the Erase element 8b, and also lower the effective potential across the electroluminescent layer 23 of the Memory element 8, sufficiently to stop the light regenerative action of the Memory element 8. An Erasure of the data previously Read into the Memory element 8 will result.

Although in the embodiments of FIGURES 3 and 4, I have shown and described a single set of Write, Read and Erase elements, it will be understood by those familiar with the art of data handling that large numbers of such sets of elements will be required for the fabrication of large capacity random-access data storage apparatus. However, it will also be understood by those skilled in the art that each of the embodiments of my invention outlined above have the capability of being utilized in a multitude of computer logic network operations. In general, individual circuitry may include gates, switches, flip-flops, counters, shift registers, etc., in the preformance of basic computer operations, such as addition, subtraction, multiplication and division.

A stated object of my invention is to provide an improvement in photoelectric devices which lend themselves extremely well to compacting large assemblies of such devices. Referring now to FIGURE 5, a further embodiment of my invention shows an assembly of circuit elements 8 described hereinbefore as circuit elements 8 in FIGURES 2, 3 and 4. A plurality of light conducting fibers 10, each having a jacket 16, are assembled in a closely packed array and secured in their respective positions by a binding material 46. This binding material may be a cement like material, or, the binder 46 may be of the low index jacket material 16, under which conditions the jacket 16 of one fiber 10 will be adjoined to the jacket 16 of adjacent fibers 10. A first transparent electrode 11 is intimately joined with the second transverse ends 22 of respective fibers 10. A photoconductor layer 15 is connected operatively with the first electrode 11, whereby, the photoconductor layer 15 will be illuminated from the second transverse ends 22 of the fibers 10, however, the illumination of the photoconductor layer 15 will be performed selectively. A plurality of second electrodes 12 are connected operatively with the photoconductor layer 15 adjacent predetermined second transverse ends 22 of the fibers 10, whereby predetermined second electrodes 12 will be electrically connected with the first electrode 11 through the thickness dimension of the illuminated photoconductor layer 15. Although each of the second electrodes 12 is shown connected operatively with the photoconductor layer 15 directly opposite the transverse end 22 of but a single fiber 10, the invention is not to be limited in the sense that the space occupied by a single fiber 10 cannot be instead occupied by several fibers of smaller cross sectional dimensions.

A third light transparent electrode 13 is intimately joined with the first transverse ends 21 of respective fibers 10. An electroluminescent layer 23 is disposed upon and intimately joined with the third electrode 13, whereby light waves emanating from the electroluminescent layer 23 will be permitted to enter the first transverse ends 21 of the fibers 10. A plurality of fourth electrodes 14 are intimately joined with the electroluminescent layer 23 adjacent predetermined first transverse ends 21 of the fibers 10, whereby the influence of an electrical potential source will be presented, selectively, across the electroluminescent layer 23 upon the application of the potential source between the third electrode 13 and predetermined fourth electrodes 14. Although each of the fourth electrodes 14 is shown intimately joined with the electroluminescent layer 23 directly opposite the transverse end 21 of but a single fiber 10, it should be understood that the space occupied by a single fiber 10 may, instead, be occupied by several fibers of smaller cross sectional dimensions. Since the primary function of the light conducting fibers 10 is to conduct light efficiently and precisely from predetermined areas of the electroluminescent layer 23, then, either a single fiber or a group of several fibers may be utilized for this purpose. The predetermined areas of the electroluminescent layer 23 from which light will be permitted to emanate will be determined by area dimensions of the individual fourth electrodes 14. If, for example, the area of the electroluminescent layer 23 from which light is emanating is equal to the combined cross sectional area dimensions of several fibers, including of course the area occupied by the jacket 16 and binding material 46, then the light will be conducted to the photoconductor layer 15 through these several fibers.

The first electrode 11 is connected to a terminal 19 and the third electrode 13 is connected to a terminal 24. The plurality of second electrodes 12 are connected to respective terminals 20, and the fourth electrodes 14 are connected to respective terminals 40. Large assemblies of these circuit elements, therefore, will be interconnected to function as circuit elements in logic networks as hereinbefore described.

It should, of course, be understood that many other embodiments embracing the general principles and construction set forth in this application may be utilized and still be within the ambit of the present invention.

The particular embodiment of the invention illustrated and described herein is illustrative only, and the invention includes such other modifications and equivalents as may be readily noted by those skilled in the arts, and within the scope of the appended claims.

I claim:

1. Photoelectric circuit elements comprising:
   a first light transparent electrode;
   a photoconductor layer
      connected operatively with said first electrode;
   a plurality of second electrodes
      intimately joined and thereby connected operatively with said photoconductor layer;
   a third light transparent electrode
      spaced apart from said first electrode;
   an electroluminescent layer
      intimately joined with said third electrode;
   a plurality of fourth electrodes
      intimately joined with said electroluminescent layer; and
   a plurality of light conductor means bonded together in a closely packed array
      intermediate said first electrode and said third electrode for conducting light selectively from said electroluminescent layer to said photoconductor layer;
   each of said light conductor means comprising a fiber and jacket assembly of light conductor materials drawn together to provide a smooth hermetically sealed interface at and along the juncture of a fire-polished fiber surface fused to a fire-polished jacket inner surface; and said fiber having a predetermined index of refraction and said jacket having an index of refraction less than said predetermined index for controlling the reflection of light through said fiber and reflection of light to said photoconductor layer;
   said photoconductor layer effecting a short circuit between said first electrode and said second electrodes upon the conduction of light from said electroluminescent layer to said photoconductor layer adjoining said second electrodes.

2. Photoelectric circuit elements comprising:
   a first light transparent electrode;
   a photoconductor layer
      connected operatively with said first electrode;
   a plurality of second electrodes
      intimately joined and thereby connected operatively with said photoconductor layer;
   a third light transparent electrode
      spaced apart from said first electrode;
   an electroluminescent layer
      intimately joined with said third electrode;
   a plurality of fourth electrodes
      intimately joined with said electroluminescent layer; and
   a plurality of light conductor means bonded together in a closely packed array
      intimately joined with said first electrode and said third electrode for conducting light emanating from predetermined areas of said electroluminescent layer to predetermined areas of said photoconductor layer;
   each of said light conductor means comprising a fiber and jacket assembly of light conductor materials drawn together to provide a smooth hermetically sealed interface at and along the juncture of a fire-polished fiber surface fused to a fire-polished jacket inner surface; and said fiber having a predetermined index of refraction and said jacket having an index of refraction less than said predetermined index for controlling the reflection of light from said predetermined areas of said electroluminescent layer through said light conductor fibers and reflection of light to said predetermined areas of said photoconductor layer;
   said photoconductor layer effecting a short circuit between said first electrode and said second electrodes upon the conduction of light from said electroluminescent layer to said photoconductor layer adjoining said second electrodes.

3. Photoelectric circuit elements comprising:
   a first light transparent electrode;
   a photoconductor layer
      connected operatively with said first electrode;
   a plurality of second electrodes
      intimately joined and thereby connected operatively with said photoconductor layer;
   a third light transparent electrode
      spaced apart from said first electrode;
   an electroluminescent layer
      intimately joined with said third electrode;
   a plurality of fourth electrodes
      intimately joined with said electroluminescent layer; and
   a plurality of light conductor means bonded together in a closely packed array
      intermediate said first electrode and said third electrode for conducting light emanating from said electroluminescent layer adjacent predetermined fourth electrodes to said photoconductor layer adjacent predetermined second electrodes;
   each of said light conductor means comprising a fiber and jacket assembly of light conductor materials drawn together to provide a smooth hermetically sealed interface at and along the juncture of a fire-polished fiber surface fused to a fire-polished jacket inner surface; and said fiber having a predetermined index of refraction and said jacket having an index of refraction less than said predetermined index for controlling the reflection of light from said electroluminescent layer through said fiber and reflection of light to said photoconductor layer adjacent said predetermined second electrodes;
   said photoconductor layer effecting a short circuit between said first electrode and said second electrodes upon the conduction of light from said electroluminescent layer to said photoconductor layer adjoining said second electrodes.

4. Photoelectric circuit elements comprising:
   a first light transparent electrode;
   a photoconductor layer
      connected operatively with said first electrode;
   a plurality of second electrodes
      intimately joined and thereby connected operatively with said photoconductor layer;
   a third light transparent electrode
      spaced apart from said first electrode;
   an electroluminescent layer
      intimately joined with said third electrode;
   a plurality of fourth electrodes
      intimately joined with said electroluminescent layer;
   a plurality of first light conductor means bonded together in a closely packed array
      intermediate said first electrode and said third electrode having a predetermined index of refraction for conducting light from said electroluminescent layer to said photoconductor layer; and
   second light conductor means jacketing each of said plurality of first light conductor means to form an assembly of light conductor materials drawn together to provide a smooth hermetically sealed interface at and along the juncture of a fire-polished fiber surface fused to a fire-polished jacket inner surface and having an index of refraction less than said predetermined index for controlling the reflection of light through said first light conductor means and reflection of light to said photoconductor layer;

said photoconductor layer effecting a short circuit between said first electrode and said second electrodes upon the conduction of light from said electroluminescent layer to said photoconductor layer adjoining said second electrodes.

5. Photoelectric circuit elements comprising:
a first light transparent electrode;
a photoconductor layer
  connected operatively with said first electrode;
a plurality of second electrodes
  intimately joined and thereby connected operatively with said photoconductor layer;
a third light transparent electrode
  spaced apart from said first electrode;
an electroluminescent layer
  intimately joined with said third electrode;
a plurality of fourth electrodes
  intimately joined with said electroluminescent layer;
a plurality of first light conductor means bonded together in a closely packed array
  intimately joined with and intermediate said first electrode and said third electrode having a predetermined index of refraction for conducting light emanating from predetermined areas of said electroluminescent layer to predetermined areas of said photoconductor layer; and
second light conductor means
  jacketing each of said plurality of first light conductor means to form an assembly of light conductor materials drawn together to provide a smooth hermetically sealed interface at and along the juncture of a fire-polished fiber surface fused to a fire-polished jacket inner surface and having an index of refraction less than said predetermined index for controlling the reflection of light emanating from said predetermined areas of said electroluminescent layer through said first light conductor means and reflection of light to said predetermined areas of said photoconductor layer;

said photoconductor layer effecting a short circuit between said first electrode and said second electrodes upon the conduction of light from said electroluminescent layer to said photoconductor layer adjoining said second electrodes.

6. Photoelectric circuit elements comprising:
a first light transparent electrode;
a photoconductor layer
  connected operatively with said first electrode;
a plurality of second electrodes
  intimately joined and thereby connected operatively with said photoconductor layer;
a third light transparent electrode
  spaced apart from said first electrode;
an electroluminescent layer
  intimately joined with said third electrode;
a plurality of fourth electrodes
  intimately joined with said electroluminescent layer;
a plurality of first light conductor means bonded together in a closely packed array
  intermediate and intimately joined with said first electrode and said third electrode having a predetermined index of refraction for conducting light emanating from said electroluminescent layer adjacent predetermined fourth electrodes to said photoconductor layer adjacent predetermined second electrodes; and second light conductor means
  jacketing each of said plurality of first light conductor means to form an assembly of light conductor materials drawn together to provide a smooth hermetically sealed interface at and along the juncture of a fire-polished fiber surface fused to a fire-polished jacket inner surface and having an index of refraction less than said predetermined index for controlling the reflection of light from said electroluminescent layer through said first light conductor means and reflection of light to said photoconductor layer;

said photoconductor layer effecting a short circuit between said first electrode and said second electrodes upon the conduction of light from said electroluminescent layer to said photoconductor layer adjoining said second electrodes.

7. A photoelectric circuit element comprising:
a first light transparent electrode;
a photoconductor layer
  connected operatively with said first electrode;
a second electrode
  intimately joined and thereby connected operatively with said photoconductor layer;
a third light transparent electrode
  spaced apart from said first electrode;
an electroluminescent layer
  intimately joined with said third electrode;
a fourth electrode
  intimately joined with said electroluminescent layer; and
a plurality of light conductor means bonded together in a closely packed array
  intimately joined with said first electrode and said third electrode within said spaced apart dimension for conducting light from said electroluminescent layer to said photoconductor layer;
each of said light conductor means comprising a fiber and jacket assembly of light conductor materials drawn together to provide a smooth hermetically sealed interface at and along the juncture of a fire-polished fiber surface fused to a fire-polished jacket inner surface; and said fiber having a predetermined index of refraction and said jacket having an index of refraction less than said predetermined index for controlling the reflection of light from said electroluminescent layer through said fiber and reflection of light to said photoconductor layer;

said photoconductor layer effecting a short circuit between said first electrode and said second electrode upon the conduction of light from said electroluminescent layer to said photoconductor layer adjoining said second electrode.

8. A photoelectric circuit element comprising:
a first light transparent electrode;
a photoconductor layer
  connected operatively with said first electrode;
a second electrode
  intimately joined and thereby connected operatively with said photoconductor layer;
a third light transparent electrode
  spaced apart from said first electrode;
an electroluminescent layer
  intimately joined with said third electrode;
a fourth electrode
  intimately joined with said electroluminescent layer;
a plurality of first light conductor means bonded together in a closely packed array
  intimately joined with said first and third electrodes within the spaced apart dimension having a predetermined index of refraction for conducting light from said electroluminescent layer to said photoconductor layer; and second light conductor means
jacketing each of said plurality of first light conductor means to form an assembly of light conductor materials drawn together to provide a smooth hermetically sealed interface at and along the juncture of a fire-polished fiber surface fused to a fire-polished jacket inner surface having an index of refraction less than said predetermined index for controlling the reflection of light from said electroluminescent layer through said first light conductor means and reflection of light to said photoconductor layer;
said photoconductor layer effecting a short circuit between said first electrode and said second electrode upon the conduction of light from said electroluminescent layer to said photoconductor layer adjoining said second electrode.

References Cited in the file of this patent
UNITED STATES PATENTS

| | | |
|---|---|---|
| 2,825,260 | O'Brien | Mar. 4, 1958 |
| 2,833,936 | Ress | May 6, 1958 |
| 2,916,630 | Rosenberg | Dec. 8, 1959 |
| 3,042,834 | Nicoll | July 3, 1962 |
| 3,045,223 | Kapany et al. | July 17, 1962 |